United States Patent [19]

Gras et al.

[11] Patent Number: 5,449,528
[45] Date of Patent: Sep. 12, 1995

[54] PROCESS FOR THE PRODUCTION OF MATT EPOXY RESIN COATINGS

[75] Inventors: Rainer Gras, Bochum; Elmar Wolf, Recklinghausen, both of Germany

[73] Assignee: Huels Aktiengesellschaft, Marl, Germany

[21] Appl. No.: 358,518

[22] Filed: Dec. 19, 1994

[30] Foreign Application Priority Data

Jan. 14, 1994 [DE] Germany .......... 44 00 929.1

[51] Int. Cl.$^6$ .............................................. B05D 3/02
[52] U.S. Cl. .................... 427/195; 427/386; 528/88; 528/93; 528/112
[58] Field of Search ................ 427/195, 386; 528/88, 528/93, 112

[56] References Cited

U.S. PATENT DOCUMENTS

| | | | |
|---|---|---|---|
| 4,175,173 | 11/1979 | Bagga et al. | 427/195 X |
| 4,283,513 | 8/1981 | Mikami | 525/476 |
| 4,528,127 | 7/1985 | Holderegger et al. | 528/112 X |
| 4,594,291 | 6/1986 | Bertram et al. | 528/112 X |

*Primary Examiner*—Michael Lusignan
*Attorney, Agent, or Firm*—Oblon, Spivak, McClelland, Maier & Neustadt

[57] ABSTRACT

A curing agent for a composition for the production of matt epoxide and hybrid powder coatings which is a mixture comprising:
  a) salts of phthalic, isophthalic and terephthalic acid and the following guanidines.

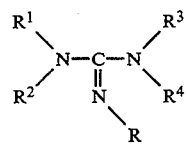

A)

wherein R, $R^1$, $R^2$, $R^3$ and $R^4$ may be identical or different radicals selected from the group consisting of H, (cyclo)alkyl and aromatic hydrocarbon radicals having 1-9 carbon atoms and where $R^1$ with $R^2$ and $R^3$ with $R^4$ each form a ring which contains an oxygen atom as heteroatom, and 0.5-2 mol of the guanidine A) react per mole of acid, and
  b) pyromellitic acid and/or trimellitic acid, 0.25-2 mol of b) employed per mole of a).

5 Claims, No Drawings

PROCESS FOR THE PRODUCTION OF MATT EPOXY RESIN COATINGS

BACKGROUND OF THE INVENTION

Field of the Invention

The present invention relates to a process for the production of matt epoxide and hybrid powder coatings.

SUMMARY OF THE INVENTION

One object of the present invention is to provide a curing agent as a component for an epoxide powder for the preparation of matt epoxide coatings.

Briefly, this object and other objects of the present invention as hereinafter will become more readily apparent can be attained by a curing agent for an epoxide formulation for the preparation of matt finishes, which curing agent is a mixture comprising:

a) salts of phthalic, isophthalic and terephthalic acid and the guanidines:

A)

in which R, $R^1$, $R^2$, $R^3$ and $R^4$ may be identical or different radicals selected from the group consisting of H, (cyclo)alkyl and aromatic hydrocarbon radicals having 1-9 carbon atoms and where $R^1$ with $R^2$ and $R^3$ with $R^4$ each group jointly may form a ring which can contain an oxygen atom as a heteroatom, wherein 0.5-2 mol of the guanidine A) reacts per mole of acid, and b) pyromellitic acid and/or trimellitic acid, 0.25-2 tool of b) being employed per mole of a).

DETAILED DESCRIPTION OF THE PREFERRED EMBODIMENTS

The salts of phthalic acid (PA), isophthalic acid (IA) and terephthalic acid (TA) which can be employed in the process of the invention contain, as amine component, guanidines which are capable of forming salts, for example tetramethylguanidine (TMG), tetramethylcyclohexylguanidine, N, N',N''-triphenylguanidine and N,N'-dicyclohexyl-4-morpholinecarboxamide. The basic N content of the salts a) which can be employed for the process according to the invention is 2-12 mol of N/g.

The curing agent mixture a) +b), which is employed in the present invention for the preparation of the pulverulent coating compositions of matt appearance, is prepared in two stages, comprising a 1st stage of formation of salts a) in solution and, after salt formation is complete, the addition, in a 2nd step, of the pyromellitic acid (PMA) and/or trimellitic acid. Subsequently, the solvent is removed. The salts a) are not part of the invention. They are prepared in a known manner by adding the guanidine A), in portions, to a solution of phthalic, isophthalic or terephthalic acid in water or ethanol, at the boiling temperature.

When the addition of guanidine is complete, heating is continued for about one hour more. Then the pyromellitic acid and/or trimellitic acid is added with intensive stirring. Subsequently the solvent is removed by distillation; it is not necessary for the pyromellitic acid and/or trimellitic acid to have dissolved. For the quantitative removal of the solvent, the reaction mixture is dried in a vacuum drying cabinet at 60° C. for about 10 h.

The salts a) are composed of 1 mol of phthalic acid and/or isophthalic acid and/or terephthalic acid and 0.5-2 mol of guanidine A). The curing agent mixture a) +b) according to the invention comprises 1 mol of aromatic dicarboxylic acid (as guanidine salt) and 0.25-2 mol of pyromellitic acid and/or trimellitic acid.

For the preparation of the pulverulent coating compositions of matt appearance, based on polyepoxides and, if desired, on polymers containing carboxyl groups, the curing agent mixture a) +b) is employed in quantities of 3-14% by weight, based on the sum of epoxy resin and the polymer which contains COOH groups and which may be present, with 0.25-2 mol of pyromellitic acid and/or trimellitic acid being present per mole of aromatic dicarboxylic acid (as salt). The polyepoxides used are solid, resinous substances which melt in the range 60°-150° C., preferably 70°-110° C., and which on average contain more than one 1,2-epoxide group per molecule; however, it is preferred to employ commercially available epoxy resins as are obtained by reaction of bisphenol A and epichlorohydrin, having an epoxide equivalent weight of between 400 and 4000, preferably 800-1000.

The carboxyl group-containing polymers are polyester-carboxylic acids which are prepared from polyols and polycarboxylic acids and/or their derivatives. The melting range of these acidic polyesters is in a range of 60°-160° C., preferably 80°-120° C.; their acid number varies from 10-150 mg of KOH/g, preferably 30-60 mg of KOH/g. The OH numbers should be below 10 mg of KOH/g.

Suitable examples of polycarboxylic acids employed for the preparation of the polyester-polycarboxylic acids to be used in accordance with the invention include oxalic, adipic, 2,2,4-(2,4,4-) trimethyladipic, azelaic, sebacic, decane-dicarboxylic, dodecanedicarboxylic, fumaric, phthalic, isophthalic, terephthalic and trimellitic acid. Suitable polyols for the preparation of the acidic polyesters include ethylene glycol, 1,2- and 1,3-propanediol, 1,2-, 1,3-, 1,4- and 2,3-butanediol, 1,5-pentanediol, 3-methyl-1,5-pentanediol, neopentylglycol, 1,12-dodecanediol, 2,2,4-(2,4,4-)trimethyl-1,6-hexanediol, trimethylolpropane, glycerol, pentaerythritol, 1,4-bishydroxymethylcyclohexane, cyclohexane-1,4-diol, diethylene glycol, triethylene glycol and dipropylene glycol. It is of course also possible to react polyesters which contain hydroxyl groups, and which are prepared by known methods from polycarboxylic acids and polyols, with polycarboxylic acids and/or polycarboxylic acid anhydrides to give the polyester-polycarboxylic acids.

Instead of the polyesters containing carboxyl groups, it is also possible to employ acrylate resins which contain carboxyl groups.

The quantities of the individual powder coating binder components can be varied substantially.

In the case where the commercially available epoxy resins based on bisphenol A (+epichlorohydrin) are used exclusively, the concentration of curing agent is 3-14% by weight. Where mixtures of epoxy resins of the bisphenol A diglycidyl ester and carboxyl group-containing polyester type are used, the proportion depends on the acid number of the carboxy polyester. For example, at an acid number of 30–50 mg of KOH/g, the weight ratio of epoxy resin to carboxy polyester is usually from 60:40 to 80:20, preferably 70:30. The concentration of curing agent mixture a) +b) in these epoxy resin/carboxy polyester mixtures is 2–10% by weight. To produce the powder coating, the binders are initially mixed together with the levelling agent, pigment and/or filler and the UV and oxidation stabilizers and are homogenized in an extruder at about 100° C. The extruded composition is cooled to room temperature and then ground to give a powder coating whose average particle size should be about 40-80 μm, preferably 50 μm.

The powder coatings produced in this way can be applied to appropriate substrates by the known methods, for example by electrostatic powder spraying or fluidized-bed sintering. After the powder coating has been applied by one of the above-mentioned methods, the coated substrates are heated at temperatures of 150°–220° C. over periods of 30 sec.–8 min. for the purpose of curing. The coating films produced in this way are distinguished by very good evenness, outstanding solvent resistance and a matt surface, it being possible to adjust the degree of gloss as desired within a wide range.

I. Preparation of the salts according to the invention
General preparation procedure The amine is added in portions to the aromatic dicarboxylic acid (isophthalic, terephthalic, phthalic acid) which has been heated with from 6 to 10 times the quantity of ethanol and/or H₂O to the boiling point of the solvent. When the addition of amine is complete, heating is continued for about 1 hour more. Subsequently, the pyromellitic acid (PMA) dissolved in ethanol and/or H₂O is added in portions. After the addition of PMA the solvent is removed, generally by distillation. For quantitative removal of the solvent, the reaction product is treated further in a vacuum drying cabinet at about 60° C.

I. Epoxy Resin
In the application examples, the epoxy resin compounds are those based on bisphenol A. They have the following characteristics:

| Characteristics Example | II.1 |
|---|---|
| equivalent weight | 900–1000 |
| epoxide value | 0.1–0.111 |
| hydroxyl value | 0.34 |
| melting range | 96–104° C. |

III. Epoxy resin powder coatings

To produce the powder coatings, the ground products of curing agent, epoxy resin and levelling agent masterbatch[1] were intimately mixed with the white pigment (TiO₂) in an edge runner mill and were subsequently homogenized in an extruder at from 90° to 110° C. After cooling, the extrudate was fractionated and ground in a pin mill to a particle size <100 μm. The powder thus produced was applied, using an electrostatic powder spraying unit at 60 kV, to degreased and if appropriate, pre-treated steel panels which were baked in a circulating-air laboratory drying cabinet.

[1] Levelling agent masterbatch 10% by weight of levelling agent based on polymetric butyl acrylates is homogenized in the melt with the epoxy resins and comminuted after solidifying.

The abbreviations in the following table denote:
LT = layer thickness (μm)
CH = crosshatch test (DIN 53 151)
EI = Erichsen indentation (mm) (DIN 53 156)
GG 60° < = Gardner gloss (ASTM-D 523)
Imp. rev. = Impact Reverse (q·m)

The calculation of the coating formulations was made in accordance with the following scheme:
% by weight EP = epoxide
B−C = EP B = % by weight binder
C = % by weight crosslinking agent
B = 100−AA = % by weight additives [40% by weight white pigment (TiO₂), 0.5% by weight of levelling agent]

TABLE 1

| | Salt Examples | | | | | |
|---|---|---|---|---|---|---|
| | Moles of arom. dicarboxylic acid | Moles of TMG | Moles of PMA | m.p. °C. | N mmol/g | COOH mmol/g |
| Example I | | | | | | |
| 1 | 0.5 IA | 1.0 | 0.5 | 163–170 | 8.79 | 6.11 |
| 2 | 0.5 IA | 0.9 | 0.5 | 170–177 | 8.67 | 6.93 |
| 3 | 0.5 IA | 0.75 | 0.5 | 191–199 | 7.59 | 14.33 |
| 4 | 0.5 IA | 0.5 | 0.5 | >250 | 5.45 | 9.27 |
| 5 | 0.5 IA | 0.25 | 0.5 | 203–209 | 3.14 | 11.52 |
| 6 | 0.5 IA | 1.0 | 0.75 | 211–227 | 7.60 | 7.61 |
| 7 | 0.5 TA | 0.5 | 0.5 | 179–188 | 5.40 | 9.21 |
| 8 | 0.5 TA | 1.0 | 0.5 | 189–201 | 9.12 | 6.02 |
| 9 | 0.5 TA | 1.0 | 1.0 | 227–235 | 6.49 | 8.67 |
| 10 | 0.5 PA | 0.5 | 0.5 | 155–164 | 5.33 | 9.41 |
| 11 | 0.5 PA | 1.0 | 1.0 | 188–197 | 6.49 | 8.53 |
| Comparison Example | | | | | | |
| 12 | 0.5 IA | 0.5 | — | 134–139 | 10.48 | 3.37 |
| 13 | 1 IA | 2 | — | 60–65 waxy | 14.97 | 1.4 |
| 14 | 0.5 TA | 0.5 | — | 212–216 | 10.53 | 3.29 |
| 15 | 1 TA | 2 | — | 104–109 | 15.07 | 1.9 |
| 16 | 0.5 PA | 0.5 | — | 101–105 | 10.55 | 3.52 |

| | Crosslinking agent % by wt. | acc. to | Curing °C./min | | Mechanical Charac. LT | Mechanical Charac. CH | Mechanical Char. EI | Mechanical Char. Imp. rev. | Mechanical Char. GG 60° < |
|---|---|---|---|---|---|---|---|---|---|
| Example III | | | | | | | | | |
| 1 | 5 | I.1 | 200 | 15 | 45–50 | 0 | 8.5–9.1 | 115.2 | 28 |
| | | | | 20 | 50–60 | 0 | 9.0–9.5 | 345.6 | 29 |
| | | | 180 | 30 | 40–55 | 0 | 6.5–7.7 | 115.2 | 31 |
| 2 | 4.5 | I.2 | 200 | 15 | 50–60 | 0 | 8.7–9.5 | 115.2 | 33 |
| | | | 180 | 30 | 55–70 | 0 | 7.0–7.3 | 115.2 | 35 |
| 3 | 5 | I.2 | 200 | 12 | 45–60 | 0 | 6.7–7.5 | 115.2 | 30 |
| | | | | 15 | 50–60 | 0 | 8.5–9.2 | 230.4 | 29 |
| | | | 180 | 25 | 60–70 | 0 | 7.2–7.9 | 115.2 | 32 |
| 4 | 5 | I.4 | 200 | 10 | 65–75 | 0 | 7.1–8.3 | 230.4 | 7 |
| | | | | 15 | 60–75 | 0 | 8.1–9.0 | 460.8 | 6–7 |
| | | | 180 | 20 | 65–75 | 0 | 6.4–8.0 | 115.2 | 9 |
| | | | | 25 | 60–70 | 0 | 6.0–8.3 | 345.6 | 9 |
| | | | 170 | 25 | 70–80 | 0 | 5.7–7.3 | 230.4 | 10 |
| | | | | 30 | 60–70 | 0 | 7.0–8.3 | 345.6 | 10 |
| 5 | 5.5 | I.4 | 200 | 10 | 60–70 | 0 | 8.1–8.9 | 460.8 | 6 |
| | | | 180 | 15 | 65–70 | 0 | 3.5–5.5 | <115.2 | 8–9 |
| | | | | 20 | 65–80 | 0 | 7.8–8.3 | 345.6 | 9 |
| | | | 170 | 25 | 65–70 | 0 | 6.3–7.7 | 345.6 | 9–10 |
| | | | 160 | 30 | 60–70 | 0 | 4.3–5.1 | <115.2 | 14 |
| 6 | 6 | I.5 | 200 | 10 | 50–60 | 0 | 6.0–7.7 | 230.4 | 7 |
| | | | | 15 | 50–60 | 0 | 6.5–8.8 | 230.4 | 7 |
| | | | 180 | 20 | 75–80 | 0 | 5.5–6.5 | <115.2 | 9 |
| | | | | 25 | 70–80 | 0 | 6.1–7.1 | 115.2 | 10 |
| 7 | 5 | I.8 | 200 | 15 | 60–70 | 0 | 4.8–5.9 | <115.2 | 48 |
| | | | | 20 | 70–80 | 0 | 6.3–7.5 | 115.2 | 48 |
| 8 | 7 | I.8 | 200 | 12 | 50–60 | 0 | 6.4–7.5 | 345.6 | 31 |
| | | | | 15 | 45–60 | 0 | 7.9–8.8 | 806.4 | 30 |
| | | | 180 | 20 | 50–65 | 0 | 4.9–6.3 | 115.2 | 35 |
| | | | | 25 | 55–70 | 0 | 6.4–7.1 | 115.2 | 38 |
| 9 | 5 | I.11 | 200 | 15 | 65–75 | 0 | 5.9–7.3 | 115.2 | 27 |
| 10 | 6 | I.11 | 200 | 15 | 70–80 | 0 | 7.0–8.1 | 230.4 | 34 |
| | | | 180 | 25 | 60–70 | 0 | 6.5–7.2 | 115.2 | 38 |
| Comparison Examples | | | | | | | | | |
| 11 | 6 | I.12 | 200 | 15 | 65–80 | 0 | 7.5–8.3 | 230.4 | 77 |
| 12 | 5 | I.14 | 200 | 20 | 60–70 | 0 | 5.8–8.0 | <115.2 | 66 |
| 13 | 7 | I.14 | 200 | 15 | 50–60 | 0 | 6.3–6.7 | 230.4 | 76 |

IV. Carboxyl group-containing polyester

To produce hybrid powder coatings, the carboxyl group-containing polyesters described below were employed, having the following characteristics:

| | I | II |
|---|---|---|
| Acid number: | 52–58 mg of KOH/g | 36 mg of KOH/g |
| Melting range: | 104–106° C. | 91–94° C. |
| Glass transition temperature: | about 580 | 64° C. |
| Viscosity at 160° C.: | 33,400 mPa · s | 58,000 mPa · s |

V. Hybrid powder coatings

The processing of the raw materials, the production and the application are carried out in analogy to III.

| Example V | Crosslinking agent % by wt. | acc. to | Curing °C./min | | Mechanical characteristics | | | | |
|---|---|---|---|---|---|---|---|---|---|
| | | | | | LT | CH | EI | Imprev | GG 60° < |
| 1 | 30 | I.4 | 200 | 12 | 50 — | 0 | 6.3 — | 115.2 | 25 |
| | 315 | II.1 | | 15 | 70 | 0 | 7.0 | 230.4 | 26 |
| | 205 | IV.2 | | | 50 — | | 7.2 — | | |
| | 400 | TiO$_2$ | 180 | 25 | 60 | 0 | 8.0 | 115.2 | 25 |
| | 50 | level. MB* | | | 55 — | | 5.5 | | |
| | | | | | 60 | | 6.5 — | | |
| 2 | 50 | I.4 | 200 | 10 | 45 — | 0 | 6.5 — | 115.2 | 17 |
| | 350 | II.1 | | 15 | 60 | 0 | 7.8 | 345.6 | 18 |
| | 150 | IV.2 | | | 55 — | | 7.4 — | | |
| | 400 | TiO$_2$ | 180 | 20 | 65 | 0 | 8.4 | 115.2 | 20 |
| | 50 | level. MB | | 25 | | 0 | | 115.2 | 21 |
| | | | | | 60 — | | 5.7 — | | |
| | | | | | 70 | | 6.4 | | |
| | | | | | 65 — | | 6.5 — | | |
| | | | | | 75 | | 6.9 | | |
| 3 | 50 | I.5 | 200 | 12 | 50 — | 0 | 6.3 — | 150.2 | 13 |
| | 350 | II.1 | | 15 | 60 | 0 | 7.4 | 230.4 | 14 |

| Example V | Crosslinking agent % by wt. acc. to | | Curing °C./min | LT | CH | EI | Imprev | GG 60° < |
|---|---|---|---|---|---|---|---|---|
| | 150 | IV.2 | | 60 — | | 7.5 — | | |
| | 400 | TiO₂ | 180 25 | 70 | 0 | 8.1 | <115.2 | 16 |
| | 50 | level. MB | 70 | | | | | |
| | | | | 55 — | | 5.3 — | | |
| | | | | 70 | | 6.4 | | |

Note: *TiO₂ (white pigment); level. MB (levelling agent masterbatch)

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A curing agent for a composition for the production of matt epoxide and hybrid powder coatings which is a mixture comprising:
   a) salts of phthalic, isophthalic and terephthalic acid and guanidine of the formula:

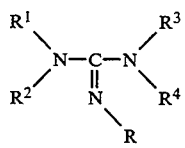

A)

wherein R, R¹, R², R³ and R⁴ may be identical or different radicals selected from the group consisting of H, (cyclo)alkyl and aromatic hydrocarbon radicals having 1-9 carbon atoms and where R¹ with R² and R³ with R⁴ each form a ring which contains an oxygen atom as heteroatom, and 0.5-2 mol of the guanidine A) react per mole of acid, and
   b) pyromellitic acid and/or trimellitic acid, 0.25-2 mol of b) employed per mole of a).

2. A composition for the production of a matt epoxide or hybrid powder coating, comprising:
   a polyepoxide and optionally a polymer containing carboxyl group and the curing agent mixture of claim 1.

3. The composition of claim 2, wherein the amount of the curing agent mixture in the composition ranges from 3 to 14% by wt, based on the sum of the epoxy resin and the optional polymer containing carboxyl groups.

4. A process for the production of matt epoxide and hybrid powder coatings, comprising:
   applying the composition of claim 2 to a substrate; and
   heating the applied composition to cure the applied composition to a matt finish.

5. The process of claim 4, wherein the applied coating is heated to a temperature of 150°-220° C. over a period of 30 sec.-8 min.

* * * * *